(12) United States Patent
Gounares

(10) Patent No.: US 8,615,766 B2
(45) Date of Patent: Dec. 24, 2013

(54) HYBRID OPERATING SYSTEM

(75) Inventor: Alexander G. Gounares, Kirkland, WA (US)

(73) Assignee: Concurix Corporation, Kirkland, WA (US)

( * ) Notice: Subject to any disclaimer, the term of this patent is extended or adjusted under 35 U.S.C. 154(b) by 108 days.

(21) Appl. No.: 13/461,733

(22) Filed: May 1, 2012

(65) Prior Publication Data

US 2012/0227040 A1 Sep. 6, 2012

(51) Int. Cl.
*G06F 9/50* (2006.01)
*G06F 9/00* (2006.01)
*G06F 15/177* (2006.01)

(52) U.S. Cl.
USPC .............................................. 718/104; 713/2

(58) Field of Classification Search
None
See application file for complete search history.

(56) References Cited

U.S. PATENT DOCUMENTS

| | | | |
|---|---|---|---|
| 4,747,040 A | 5/1988 | Blanset et al. | |
| 5,063,494 A | 11/1991 | Davidowski et al. | |
| 5,278,973 A | 1/1994 | O'Brien et al. | |
| 6,961,870 B2 | 11/2005 | Chiu et al. | |
| 7,356,680 B2 | 4/2008 | Svensson et al. | |
| 7,424,623 B2 | 9/2008 | Du et al. | |
| 7,516,319 B2 | 4/2009 | Chen | |
| 7,549,041 B2 | 6/2009 | Wang | |
| 7,660,979 B2 | 2/2010 | Tseng | |
| 7,664,945 B2 | 2/2010 | Ueno et al. | |
| 7,689,820 B2 | 3/2010 | Pierce et al. | |
| 7,707,362 B2 | 4/2010 | Bean et al. | |
| 7,757,100 B2 | 7/2010 | Weissman et al. | |
| 7,779,243 B2 | 8/2010 | Adrangi et al. | |
| 7,840,793 B2 | 11/2010 | Wang | |
| 7,890,741 B2 | 2/2011 | Du et al. | |
| 7,900,035 B2 | 3/2011 | Yoshida et al. | |
| 2002/0103996 A1 | 8/2002 | LeVasseur | |
| 2003/0177276 A1 | 9/2003 | Chiu et al. | |
| 2003/0177334 A1* | 9/2003 | King et al. | ..................... 711/209 |
| 2004/0088697 A1 | 5/2004 | Schwartz et al. | |
| 2006/0101259 A1 | 5/2006 | Chen | |
| 2007/0022147 A1 | 1/2007 | Bean et al. | |
| 2008/0077786 A1 | 3/2008 | Pierce et al. | |

(Continued)

FOREIGN PATENT DOCUMENTS

| | | |
|---|---|---|
| JP | 2005346358 A | 12/2005 |
| JP | 2006350956 A | 12/2006 |
| JP | 2009217750 A | 9/2009 |
| JP | 2010198165 A | 9/2010 |

OTHER PUBLICATIONS

International Searching Authority, International Search Report and Written Opinion, Korean Intellectual Property Office, PCT/US2012/041015, Jun. 27, 2013.

*Primary Examiner* — Qing Wu
(74) *Attorney, Agent, or Firm* — Russell S. Krajec

(57) ABSTRACT

A hybrid operating system may allocate two sets of resources, one to a first operating system and one to a second operating system. Each operating system may have a memory manager, process scheduler, and other components that are aware of each other and cooperate. The hybrid operating system may allow one operating system to provide one set of services and a second operating system to provide a second set of services. For example, the first operating system may have monitoring applications, user interfaces, and other services, while the second operating system may be a lightweight, high performance operating system that may not provide the same services as the first operating system.

9 Claims, 3 Drawing Sheets

(56) References Cited

U.S. PATENT DOCUMENTS

| | | |
|---|---|---|
| 2008/0077943 A1 | 3/2008 | Pierce et al. |
| 2008/0155246 A1 | 6/2008 | Jennings et al. |
| 2008/0162914 A1 | 7/2008 | Adrangi et al. |
| 2008/0263371 A1 | 10/2008 | Weissman et al. |
| 2009/0064195 A1 | 3/2009 | Chin et al. |
| 2010/0017591 A1 | 1/2010 | Smith et al. |
| 2010/0085984 A1 | 4/2010 | Shin et al. |
| 2010/0174895 A1 | 7/2010 | Pierce et al. |
| 2010/0262318 A1 | 10/2010 | Ariens |
| 2010/0319008 A1 | 12/2010 | Ho et al. |
| 2011/0016301 A1 | 1/2011 | Galicia et al. |
| 2011/0022832 A1 | 1/2011 | Motohama et al. |
| 2011/0055536 A1 | 3/2011 | Banga et al. |
| 2012/0005691 A1 | 1/2012 | Wong et al. |
| 2012/0023311 A1* | 1/2012 | Yamamoto et al. ........... 712/205 |
| 2012/0222019 A1 | 8/2012 | Gounares et al. |
| 2012/0222043 A1 | 8/2012 | Gounares et al. |
| 2012/0227040 A1 | 9/2012 | Gounares |
| 2012/0233592 A1 | 9/2012 | Gounares |
| 2012/0233601 A1 | 9/2012 | Gounares et al. |
| 2012/0317371 A1 | 12/2012 | Gounares |
| 2012/0317389 A1 | 12/2012 | Gounares |
| 2012/0317421 A1 | 12/2012 | Gounares |
| 2012/0317557 A1 | 12/2012 | Garrett |
| 2012/0317577 A1 | 12/2012 | Garrett |
| 2012/0317587 A1 | 12/2012 | Garrett |
| 2012/0324454 A1 | 12/2012 | Gounares et al. |
| 2013/0067445 A1 | 3/2013 | Gounares et al. |
| 2013/0073523 A1 | 3/2013 | Gounares et al. |
| 2013/0073604 A1 | 3/2013 | Gounares et al. |
| 2013/0073829 A1 | 3/2013 | Gounares et al. |
| 2013/0073837 A1 | 3/2013 | Li et al. |
| 2013/0074049 A1 | 3/2013 | Gounares et al. |
| 2013/0074055 A1 | 3/2013 | Gounares et al. |
| 2013/0074056 A1 | 3/2013 | Gounares et al. |
| 2013/0074057 A1 | 3/2013 | Gounares et al. |
| 2013/0074058 A1 | 3/2013 | Gounares et al. |
| 2013/0074092 A1 | 3/2013 | Gounares et al. |
| 2013/0074093 A1 | 3/2013 | Gounares et al. |
| 2013/0080760 A1 | 3/2013 | Li et al. |
| 2013/0080761 A1 | 3/2013 | Garrett et al. |
| 2013/0081005 A1 | 3/2013 | Gounares et al. |
| 2013/0085882 A1 | 4/2013 | Gounares et al. |
| 2013/0117753 A1 | 5/2013 | Gounares et al. |
| 2013/0117759 A1 | 5/2013 | Gounares et al. |
| 2013/0219057 A1 | 8/2013 | Li et al. |
| 2013/0219372 A1 | 8/2013 | Li et al. |
| 2013/0227529 A1 | 8/2013 | Li et al. |
| 2013/0227536 A1 | 8/2013 | Li et al. |
| 2013/0229416 A1 | 9/2013 | Krajec et al. |
| 2013/0232174 A1 | 9/2013 | Krajec et al. |
| 2013/0232433 A1 | 9/2013 | Krajec et al. |
| 2013/0232452 A1 | 9/2013 | Krajec et al. |

* cited by examiner

HYBRID OPERATING SYSTEM

BACKGROUND

Every operating system ever created has its own set of features and drawbacks. Some operating systems may be full featured, with an extensive set of capabilities, while other operating systems may be leaner and capable of faster processing. Additionally, various applications may be written to be executed within one operating system but not another.

Many computer systems are designed to operate with a single operating system. Some computer systems execute additional operating systems using hypervisors, user mode, or other techniques to present a virtualized hardware platform to a guest operating systems. Such techniques add a layer of complexity and processing between the guest operating system and the hardware, adding to decreased performance of the guest operating system.

SUMMARY

A hybrid operating system may allocate two sets of resources, one to a first operating system and one to a second operating system. Each operating system may have a memory manager, process scheduler, and other components that are aware of each other and cooperate. The hybrid operating system may allow one operating system to provide one set of services and a second operating system to provide a second set of services. For example, the first operating system may have monitoring applications, user interfaces, and other services, while the second operating system may be a lightweight, high performance operating system that may not provide the same services as the first operating system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
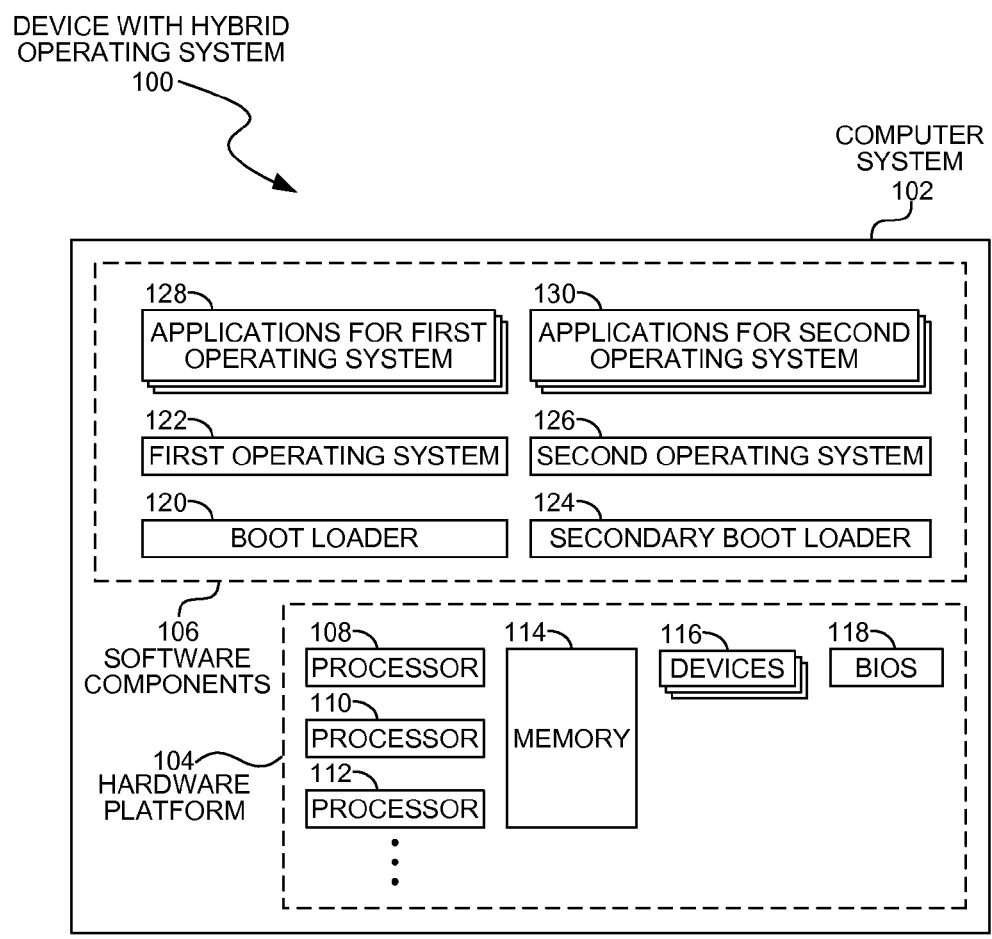
FIG. 1 is a diagram illustration of an embodiment showing a system with a hybrid operating system.

Two separate operating systems may execute on a single computer device by allocating subsets of processors and memory to each of the operating systems. Both operating systems may have access to the same resources, but may be configured to share the resources.

The two operating systems may be installed by bootstrapping a first operating system using all of the resources, then allocating a subset of the resources to the first operating system and bootstrapping the second operating system into the remaining resources.

In one use scenario, a full featured operating system and a high performance operating system may execute on the same device. The full featured operating system may have one set of applications, such as monitoring applications, while a high performance operating system may be a lightweight operating system that may execute a computationally intensive application. The full featured operating system may be limited to a subset of memory and processors, while the high performance operating system may be allocated to all of the remaining memory and processors.

Some other systems may use hypervisors to virtualize two different operating systems on the same device. Such systems add an additional software layer between the hardware and a guest operating system. The additional software layer may present a virtualized hardware construct to the guest operating system. This additional layer may add both complexity and reduce performance of the guest operating system.

A computer with a hybrid operating system may allow a guest operating system to have direct access to underlying resources, such as memory and processors. The direct access may allow the guest operating system to execute faster and simpler than in a hypervisor environment.

Both operating systems in a hybrid operating system may be aware of the other operating system and share resources. For example, both operating systems may have full access to the underlying memory, yet each operating system may be configured to only access its own portion of the memory.

The allocation of resources between the operating systems may be established during the bootstrapping process. The first operating system may load onto the hardware and configure the hardware for use, then shrink itself into a subset of the hardware before the second operating system is loaded into the remaining resources. The resource allocation may be made prior to loading the second operating system.

Some embodiments may allow the resources to be deallocated from one operating system and allocated to the other operating system while both operating systems are executing.

Throughout this specification, references may be made to the operating system operating 'directly' on various hardware components. In many embodiments, a hybrid operating system may be executed on a hardware platform, such as a server or desktop computer.

In other embodiments, a hybrid operating system may be executed in a virtualized environment. In such an embodiment, a hypervisor or other software construct may present a software version of hardware components to the hybrid operating system. A hybrid operating system in a virtualized environment may interact with the virtualized hardware components in the same manner as if the hybrid operating system were executing on a hardware platform that is not virtualized. For example, a virtualized hardware platform may present a memory block to the hybrid operating system and each operating system in the hybrid operating system may have access to the virtualized memory block in the same manner as when the hybrid operating system is executed on hardware without the virtualized environment.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Further-more, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system that may execute a hybrid operating system. Embodiment 100 is a simplified example of the various components that may be used within a hybrid operating system.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 illustrates a computer system 102 that may execute two operating systems concurrently on the same hardware platform. Both operating systems may execute on the hardware platform without virtualizing one operating system with respect to the other.

Both operating systems may have direct access to the underlying hardware components, such as memory, processors, the BIOS, and various devices, yet both operating systems may execute concurrently on the computer system 102. Both operating systems may be aware of each other in that each operating system may be capable of accessing all of the underlying resources, and each operating system may specifically limit itself so that it does not access resources that are allocated to the other operating system.

The operating systems may load in a sequence where one operating system loads first, allocates resources for the second operating system, then the second operating system loads and executes.

The computer system 102 may have a hardware platform 104 and a set of software components 106.

The hardware platform 104 may have several processors 108, 110, and 112. Some embodiments may be multi-core or many-core architectures where the computer system may have two, four, eight, or even dozens or hundreds of processor cores.

The hardware platform 104 may also have memory 114, which may be random access memory, as well as various devices 116, BIOS 118, and other resources. The devices 116 may include storage devices such as disk drives, network connection devices such as wireless or hard wired network interfaces, user interface devices such as displays and user input devices, as well as other devices.

The software components 106 may include a boot loader 120 which may be called when the computer system 102 is turned on. Many devices may have a BIOS that points to a storage location where a boot loader 120 may reside. The boot loader 120 may cause the first operating system 122 to load.

Some embodiments may use other technologies to load and boot an operating system. For example, Preboot eXecution Environment (PXE) is a technology by which a computer may boot over a network, as opposed to booting from a local disk. Other remote booting technologies may also be used, including diskless node technologies, Remote Initial Program Load (RIPL), and other technologies.

For the purposes of this specification, a boot loader may be used to illustrate the concepts of loading and starting an operating system. However, the boot loader may be substituted for any other technology for loading and starting an operating system, including various technologies by which an operating system may be loaded over a network connection.

In many embodiments, the first operating system 122 may be loaded into memory 114, then may perform some hardware initialization operations. Such operations may include testing all of the memory 114, initializing each of the various processors, and setting the various devices 116 into a state ready for operation. In other embodiments, the first operating system 122 may initialize only a subset of the hardware components.

After the first operating system 122 begins execution, a secondary boot loader 124 may be invoked. The secondary boot loader 124 may load a second operating system 126 into memory and begin execution of the second operating system 126.

The second operating system 126 may execute on a subset of the hardware platform 104 that may be allocated to the second operating system 126. Prior to executing the secondary boot loader 124, the first operating system 122 may free up resources for the second operating system 126.

The process of freeing up resources may involve blocking off resources in a manner such that the first operating system no longer uses those resources. For example, the first operating system 122 may block off a portion of memory 114 so that the first operating system 122 may not store or retrieve items into that portion of memory 114. The first operating system 122 may still be capable of addressing and accessing that portion of memory, but the first operating system 122 may have a mechanism to block off that portion of memory so that the second operating system 126 may read and write into those memory areas.

Similarly, the various processors may be freed up by limiting the first operating system to operating on a subset of the processors. While the first operating system 122 may have access to each of the various processors, the first operating system 122 may only access its allocated subset so that the second operating system 126 may operate on the subset of processors allocated to it.

Each operating system may have its own set of applications that may be executed within that operating system. A set of applications 128 for the first operating system 122 and a second set of applications 130 for the second operating system may be executed simultaneously on the computer system 102. The various applications on their respective operating systems may be executed without interacting across the operating systems.

A conventional operating system may generally start operations using the first processor 108 and begin addressing memory 114 at address location zero. In a hybrid operating system, at least one of the operating systems may execute on a processor other than the first processor 108 and may begin addressing memory 114 somewhere in the middle of the memory address range. Many conventional operating systems may be hard coded to only begin operation on the first processor and begin addressing memory at the beginning of the address range.

In some embodiments of a hybrid operating system, the first operating system 122 may have a default configuration where the first operating system 122 may begin execution on the first processor 108 and begin addressing memory 114 at the lowest address range. After limiting its own access to the full range of processors and memory, the first operating system 122 may free up access to those resources for the second operating system 126.

In such an embodiment, the second operating system 126 may be configured to begin execution on a processor other than the first processor 108. Such a configuration may be non-conventional, in that a conventional version of the operating system may be hard coded to begin execution on the first processor and begin addressing at a midpoint of the memory location.

The second operating system 126 may accept input parameters from the secondary boot loader 124 or some other source that define which processors the second operating system may use and a memory range for the second processor. The input parameters may be hard coded into the secondary boot loader 124, defined in the BIOS 118, or be stored in some other location prior to starting the computer system 102.

In some embodiments, the first operating system 122 may analyze the hardware platform 104 and may determine which processors and memory locations may be allocated to the second operating system 126. In such embodiments, the results of such an analysis may be transmitted to the secondary boot loader 124 to cause the second operating system 126 to operate within the determined memory and on the selected processors.

Such embodiments may have an algorithm, heuristic, or other mechanism to analyze which resources to allocate to the two operating systems. The second operating system 126 may be capable of receiving input parameters that define which processors and memory locations it will utilize during the boot sequence and during normal operations.

The second operating system 126 may not be capable of being configured to accept variable assignments for memory addresses and processors. In such a case, the second operating system 126 may only be configurable to begin execution on the first processor 108 and begin addressing memory 114 at a default location.

In such an embodiment, the first operating system 122 may load into memory using the first processor 108 and addressing memory 114 at the respective default configuration. Once the first operating system 122 is executing, the first operating system 122 may free up the first processor 108 and the lower end of the memory address space. The first operating system 122 may assign itself to the upper end of the processors and memory, thus freeing up the default locations where the second operating system 126 may be hard coded to begin execution.

In such an embodiment, both operating systems may be hard coded or otherwise configured to begin operations on the first processor and at the default memory location.

Figure 2:
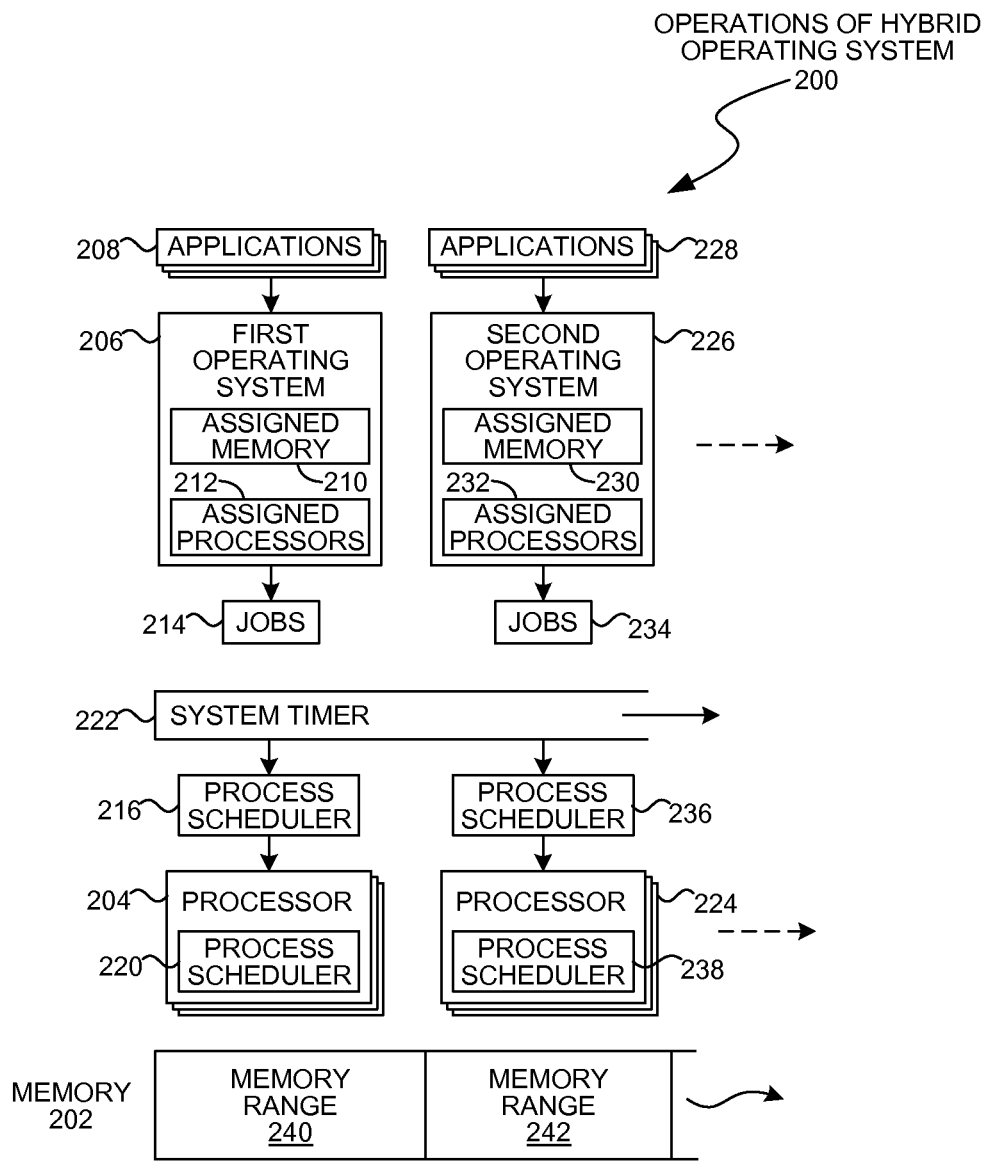
FIG. 2 is a diagram illustration of an embodiment showing a hardware and software components that may be used in a hybrid operating system.

FIG. 2 is a diagram illustration of an embodiment 200 showing various hardware and software components that may operate concurrently on a single computer system. Embodiment 200 is a simplified example of the components that may exist in a computer system with a hybrid operating system where two operating systems operate concurrently on a hardware platform, but may be assigned to different processors and memory ranges.

Embodiment 200 illustrates two operating systems that may separately but concurrently execute on the same hardware platform. Other embodiments may have three, four, or more operating systems executing on the same hardware platform.

Embodiment 200 illustrates a first operating system 206 that may operate on a first group of processors 204 and a second operating system 226 that may operate on a second group of processors 224.

While both operating systems may have access to the entire memory 202, each operating system may restrict its access to different memory ranges. The first operating system 206 may be limited to memory range 240 while the second operating system 226 may be limited to memory range 242.

The first operating system 206 may have a set of applications 208 that may execute within the first operating system 206, which may produce a set of jobs 214 for the processors 204 to execute. A process scheduler 216 may schedule the jobs 214 on the processors 204. In some embodiments, each processor 204 may have a separate process scheduler 220 that may schedule jobs assigned to that specific processor.

Similarly, the second operating system 226 may execute a second set of applications 228, producing a set of jobs 234 for the processors 224. A process scheduler 236 may distribute the jobs 234 to the various processors 224. In some embodiments, each processor 224 may have a separate process scheduler 238.

A common system timer 222 may send input to both of the process schedulers 216 and 236 simultaneously, yet each process scheduler 216 and 236 may otherwise operate independently.

The process schedulers 216 and 236 may schedule the operations of the various processors. Some operating systems may use time slicing, time division multiplexing, or other techniques to execute multiple threads or applications in a parallel or quasi-concurrent fashion. Other operating systems may prioritize different threads or applications in different manners or have various implementations of process schedulers. In some operating systems, each processor may have an independent process scheduler, while other operating systems may have a single process scheduler that schedules operations on multiple processors.

The first operating system 206 and second operating system 226 may operate separately and independently, even though both operating systems execute on the same hardware platform and may share a system timer 222, memory 202, and other hardware level components.

Each operating system may be assigned a subset of the processors and memory in which to operate. Since both operating systems may be low level software that may have direct access to the hardware, each operating system may have assigned portions of the hardware in which it may operate.

The first operating system 206 may have an assigned memory 210 and assigned processors 212, while the second operating system 226 may have assigned memory 230 and assigned processors 232.

Within the assigned resources, the operating system may utilize the resources in various manners. For example, one operating system may only address the available memory, while another operating system may have a virtualized memory system with paging such that it may present a larger memory range to its applications than the physical memory assigned to the operating system.

Although the various embodiments illustrated in this specification show two operating systems on a single device, the same concepts may be applied to systems that execute three, four, or more different operating systems on the same device.

Figure 3:
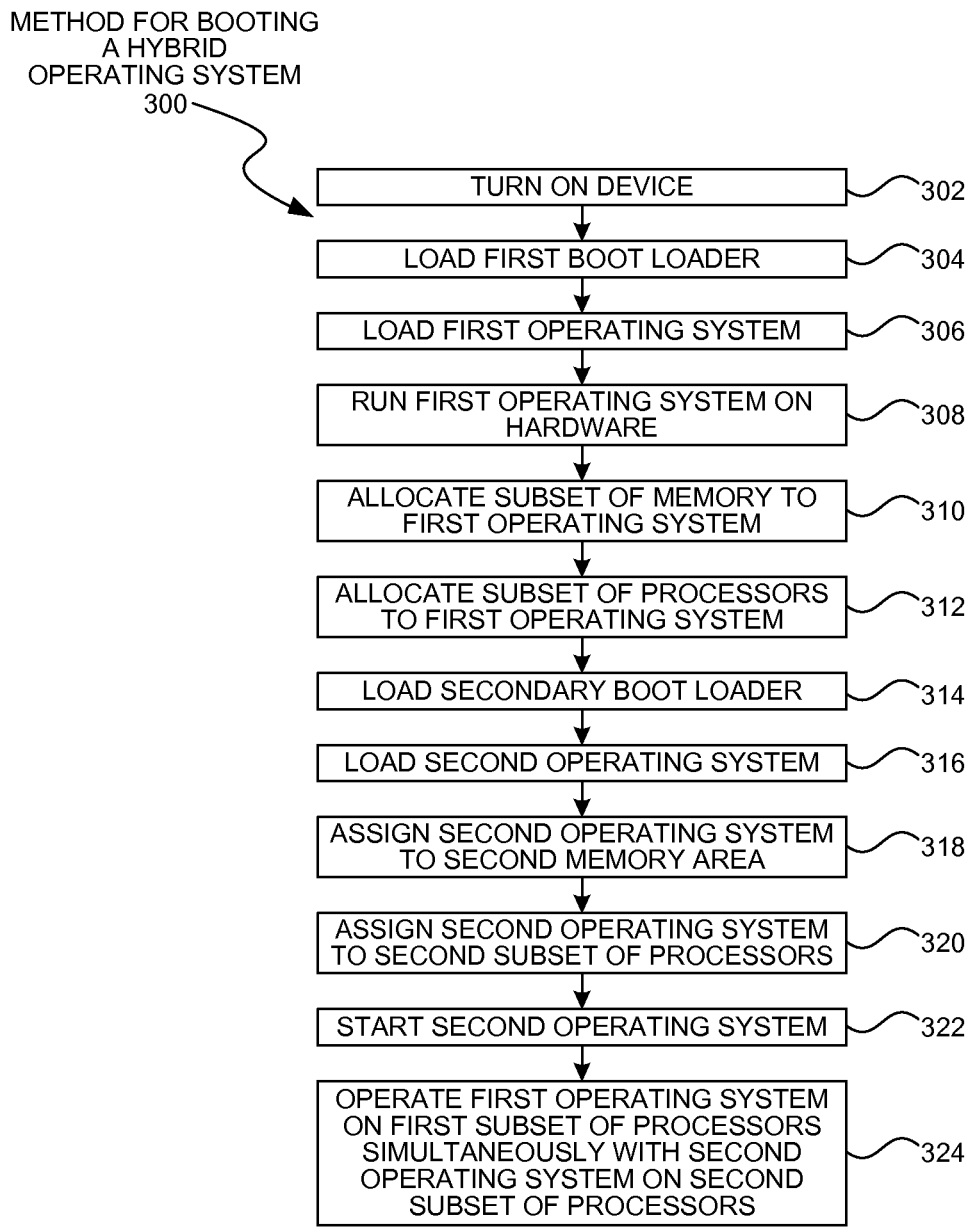
FIG. 3 is a flowchart illustration of an embodiment showing a method for loading and executing a hybrid operating system.

FIG. 3 is a flowchart illustration of an embodiment 300 showing a method for loading a hybrid operating system. Embodiment 300 is a simplified example of a sequence for booting a first operating system, compressing the resources assigned to the first operating system, then loading a second operating system within the freed up resources.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A device may be turned on in block 302 and a first boot loader may be loaded and begin operating in block 304.

In many computer devices, a BIOS or other mechanism may cause a boot loader to launch. A typical embodiment may have a default storage memory address that may contain instructions for the boot loader, and the default storage memory address may be hard coded into a BIOS or other mechanism to cause a processor to begin executing the instructions at the defined location.

In some computer systems, the BIOS or other mechanism may begin a process to download an operating system over a network connection. An example technology for performing such a function may be PXE.

The first boot loader may load the first operating system in block 306, which may begin execution in block 308.

In some embodiments, the first operating system may perform analysis of the hardware components, such as the memory, processors, devices, and other components, and may prepare those components for operation. The preparation may involve loading device drivers and configuring devices, setting processors to specific conditions, or other operations.

The first operating system may be allocated to a subset of the memory in block 310 and to a subset of the processors in block 312. The process of allocating resources to the first operating system may effectively shrink the first operating system from executing on the complete set of resources to operating on a subset of the resources.

In some embodiments, the first operating system may be able to block out certain resources in a manner that prevents the first operating system from using those resources. Once the resources are blocked out or no longer accessed by the first operating system, the second operating system may be operated within those resources. When the second operating system is executing, the second operating system may block out the resources assigned to the first operating system.

In a hybrid operating system that has two operating systems, one operating system may be operated on an upper end of memory addresses and processor identifiers while another operating system may be operated on the lower end of memory addresses or set of processors. Some embodiments may have one operating system operating on the lower end of memory addresses and upper end of processors identifiers.

A secondary boot loader may be loaded and executed in block 314, which may load a second operating system in block 316. The secondary boot loader may cause the second operating system to be stored in the memory allocated for the second operating system.

In some cases, the secondary boot loader may load the second operating system from a local storage device. In other cases, the secondary boot loader may cause the second operating system to be downloaded from a network location.

Before executing the second operating system, the second operating system may be assigned to its memory area in block 318 and its processors in block 320. The memory area and processors assigned to the second operating system may be the same memory area and processors that were freed up by the first operating system in blocks 310 and 312.

When the second operating system is configured in block 318 and 320, the configuration settings may be passed to the second operating system through the secondary boot loader in some embodiments.

After configuring the second operating system in blocks 318 and 320, the second operating system may be started in block 322. In block 324, both the first operating system and the second operating system may be executed simultaneously on the same hardware.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
loading a first operating system onto a computer system having a plurality of processors;
operating said computer system using said first operating system, said first operating system having direct access to memory on said computer system;
allocating a first subset of said memory to said first operating system;
allocating a first processor to said first operating system;
loading a second operating system onto said computer system;
allocating a second subset of said memory to said second operating system;
allocating a second processor to said second operating system; and
operating said first operating system and said second operating system simultaneously on said computer system.

2. The method of claim 1 further comprising:
operating a first process scheduler for said first operating system; and operating a second process scheduler for said second operating system.

3. The method of claim 2, said first process scheduler and said second process scheduler receiving a common timer input.

4. The method of claim 3, said second operating system having access to said memory, including said first subset of said memory.

5. The method of claim 1 further comprising:
prior to said loading said second operating system, operating said computer system using said first operating system, said first operating system operating on all of said multiple processors.

6. The method of claim 5 further comprising:
shrinking said first operating system to operate on said first subset of memory.

7. The method of claim 1, said first operating system being allocated one of said processors.

8. The method of claim 1, said first operating system starting on a third processor, then moving said first operating system to said first processor.

9. The method of claim 1 further comprising:
prior to said loading said second operating system, operating said computer system using said first operating system, said first operating system operating on all of said memory.

* * * * *